United States Patent
Deac et al.

(10) Patent No.: US 11,929,644 B2
(45) Date of Patent: Mar. 12, 2024

(54) ROTATING ELECTRIC MACHINE HAVING AN IMPROVED ANNULAR COOLING CHAMBER

(71) Applicant: NIDEC PSA EMOTORS, Carrieres sous Poissy (FR)

(72) Inventors: Ioan Deac, Poissy (FR); Juan Wang, Vernouillet (FR); Hussain Nouri, Nanterre (FR); Guillaume Tardy, La Celle Saint Cloud (FR)

(73) Assignee: NIDEC PSA EMOTORS, Carrieres sous Poissy (FR)

( * ) Notice: Subject to any disclaimer, the term of this patent is extended or adjusted under 35 U.S.C. 154(b) by 383 days.

(21) Appl. No.: 17/425,262

(22) PCT Filed: Feb. 25, 2020

(86) PCT No.: PCT/FR2020/050365
§ 371 (c)(1),
(2) Date: Jul. 22, 2021

(87) PCT Pub. No.: WO2020/174182
PCT Pub. Date: Sep. 3, 2020

(65) Prior Publication Data
US 2022/0131427 A1 Apr. 28, 2022

(30) Foreign Application Priority Data
Feb. 28, 2019 (FR) ...................................... 1902101

(51) Int. Cl.
*H02K 1/20* (2006.01)
*H02K 1/18* (2006.01)
*H02K 5/20* (2006.01)

(52) U.S. Cl.
CPC .............. *H02K 1/20* (2013.01); *H02K 1/185* (2013.01); *H02K 5/203* (2021.01)

(58) Field of Classification Search
CPC ................................. H02K 1/20; H02K 1/185
See application file for complete search history.

(56) References Cited

U.S. PATENT DOCUMENTS 3,456,140 A 7/1969 Collins et al.
7,633,194 B2 * 12/2009 Dawsey ................ B60L 3/0061
310/64

(Continued)

FOREIGN PATENT DOCUMENTS

DE 100 19 914 A1 2/2001
EP 1109298 A1 6/2001

(Continued)

OTHER PUBLICATIONS

International Search Report for PCT/FR2020/050365 dated Jun. 26, 2020.
Written Opinion for PCT/FR2020/050365 dated Jun. 26, 2020.

*Primary Examiner* — Robert W Horn
(74) *Attorney, Agent, or Firm* — Sandberg Phoenix & von Gontard, PC

(57) ABSTRACT

The rotating electric machine (1) having a housing comprising first (14) and second (15) clamp members and an inner face, a stator comprising a stator body (41) clamped between the first and second clamp members and having an outer face extending opposite the inner face together defining an annular cooling chamber (21) surrounding the stator body, the stator body comprising a longitudinal stack of stator sheets (410), each stator pack of which comprises an annular core having an outer circumference and at least two radially centrifugal protuberances projecting from the outer circumference of the annular core, in the annular cooling chamber, and diametrically opposite one another, the stator sheets of the longitudinal stack being identical and two adjacent stator sheet of the longitudinal stack being angularly offset from (Continued)

each other such that the respective protuberances thereof do not extend opposite one another.

12 Claims, 3 Drawing Sheets

(56) References Cited

U.S. PATENT DOCUMENTS

| | | | |
|---|---|---|---|
| 2022/0131427 A1* | 4/2022 | Deac | H02K 9/197 |
| 2022/0286002 A1* | 9/2022 | Marsetz | H02K 5/203 |

FOREIGN PATENT DOCUMENTS

| | | | | |
|---|---|---|---|---|
| FR | 3059172 A1 * | 5/2018 | | H02K 9/19 |
| FR | 3059172 A1 | 5/2018 | | |
| JP | S60121941 A | 6/1985 | | |
| JP | S6229735 U * | 2/1987 | | |
| JP | S6229735 U | 2/1987 | | |
| JP | H1118334 A | 1/1999 | | |
| JP | 2012050317 A | 3/2012 | | |
| JP | 5699824 B2 * | 4/2015 | | |
| JP | 2019110664 A * | 7/2019 | | |

* cited by examiner

[Fig. 1]
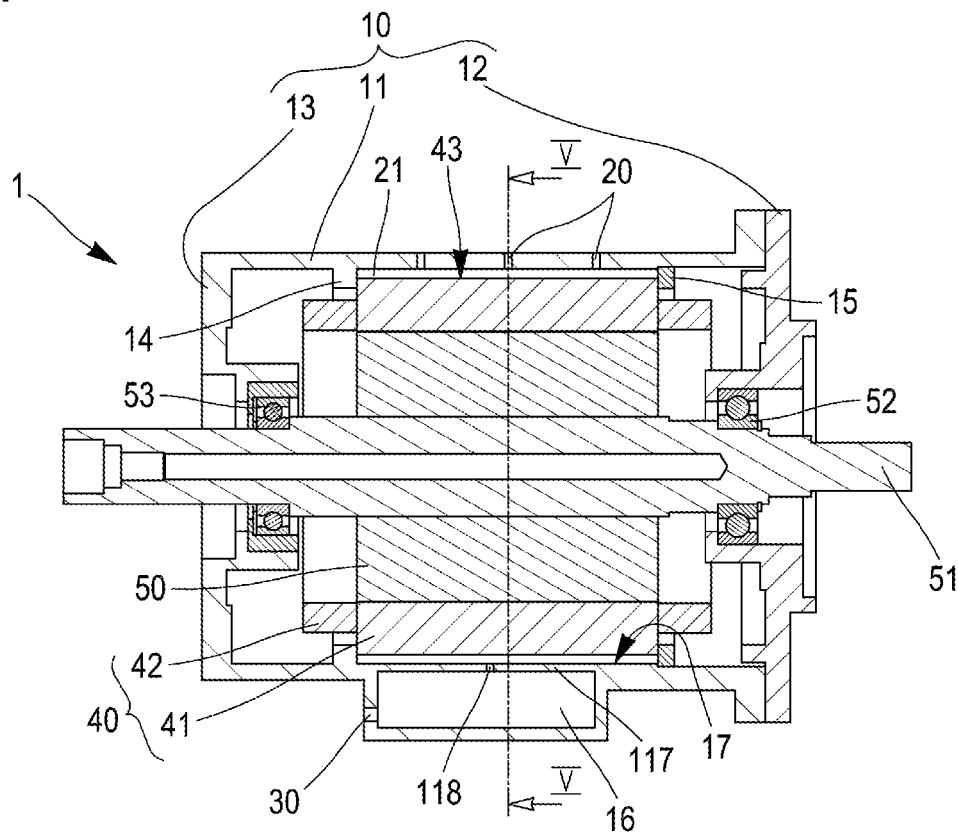
[Fig. 2]
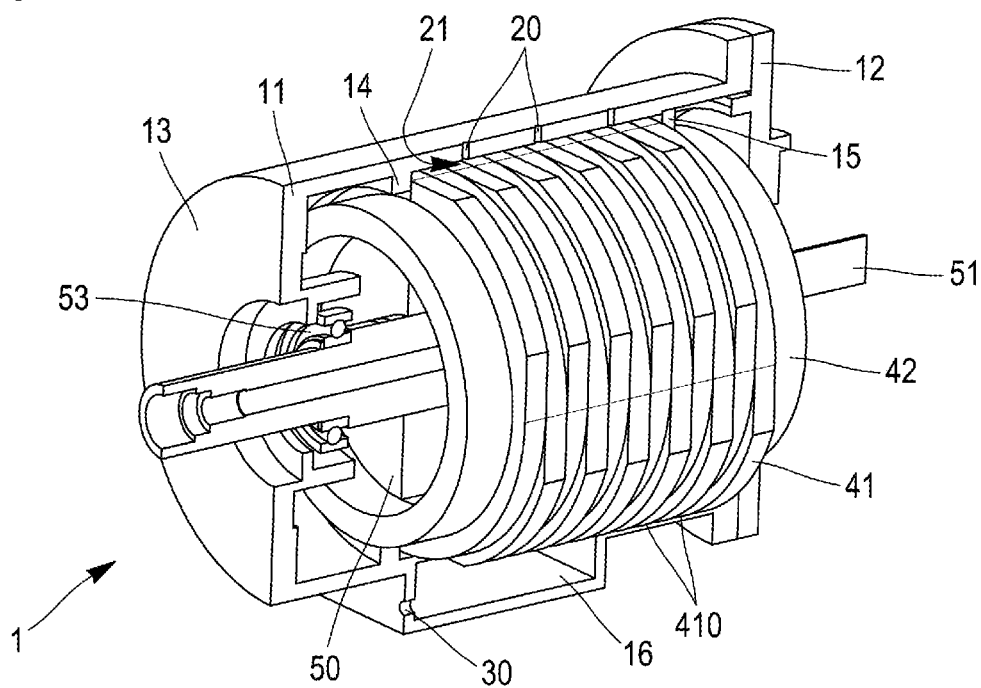

[Fig. 3]
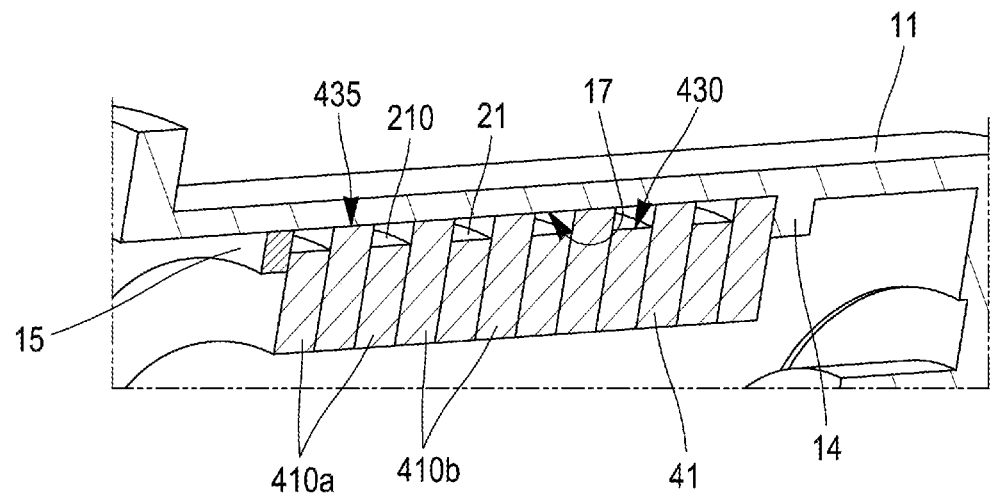
[Fig. 4]
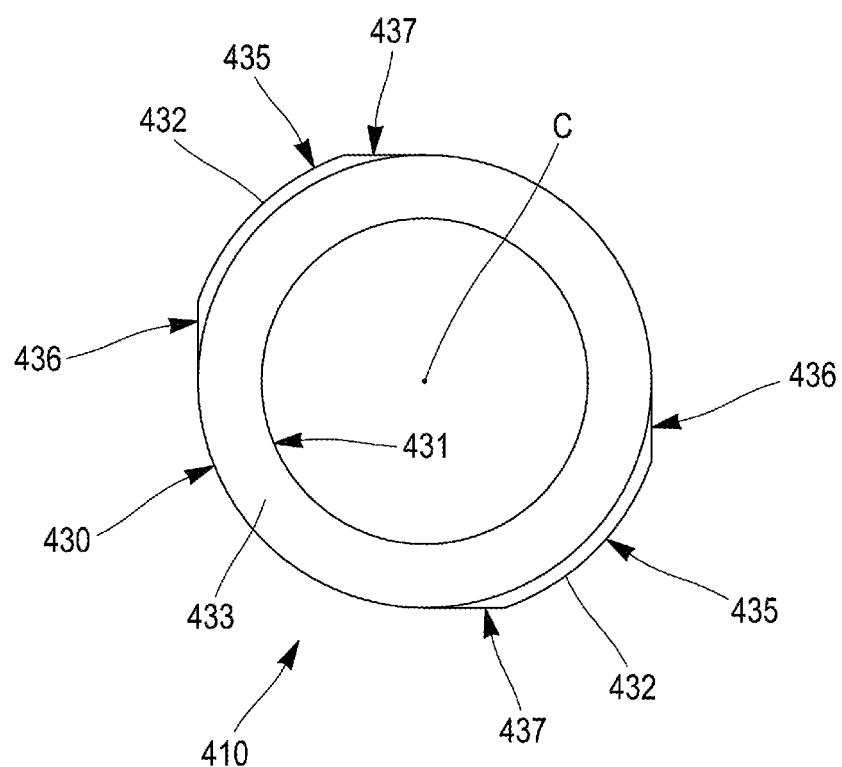

[Fig. 5]
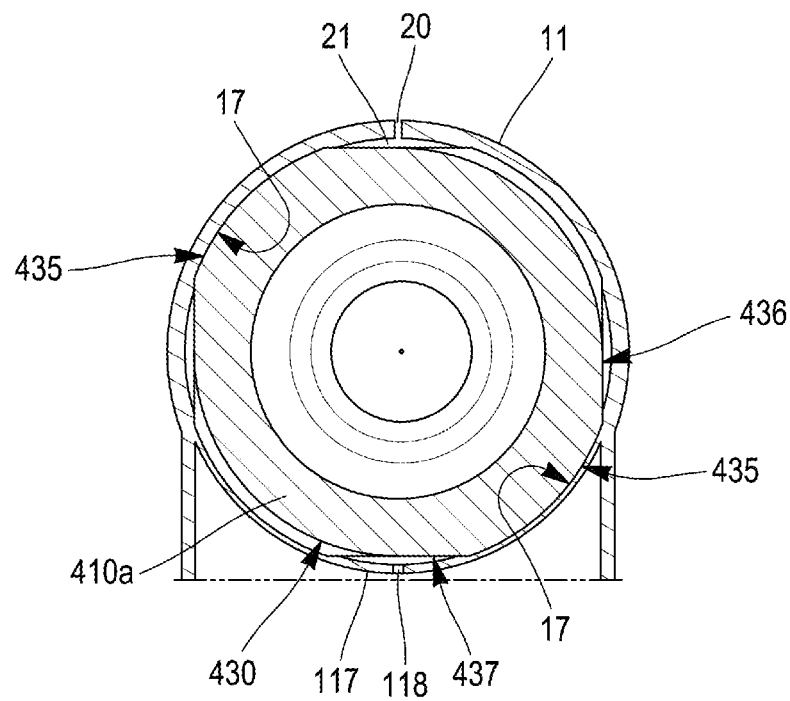
[Fig. 6]
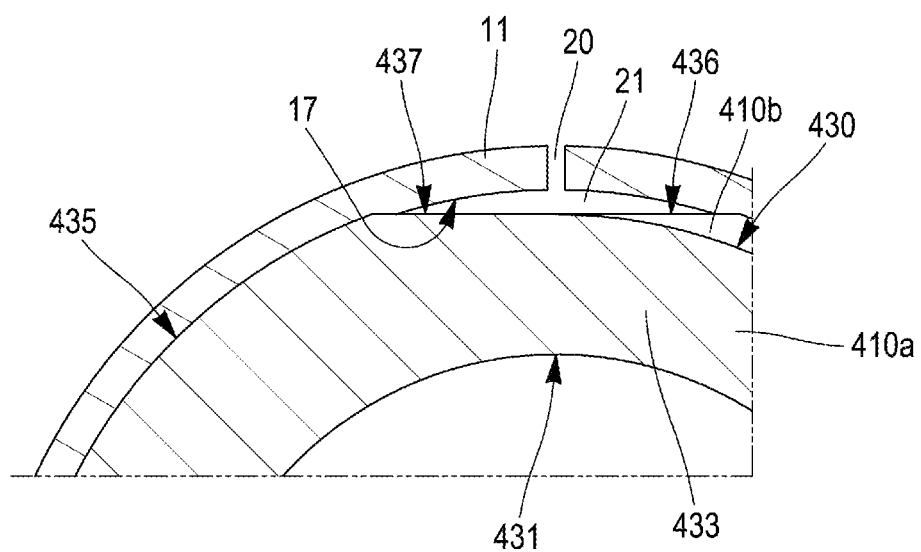

ROTATING ELECTRIC MACHINE HAVING AN IMPROVED ANNULAR COOLING CHAMBER

CROSS-REFERENCE TO RELATED APPLICATIONS

This application is the US National Stage under 35 USC § 371 of International Application No. PCT/FR2020/050365, filed Feb. 25, 2020 which claims the priority of French application 1902101 filed on Feb. 28, 2019, the content of which (text, drawings and claims) is incorporated here by reference.

BACKGROUND

The invention relates to a rotating electric machine of the type comprising a housing and a stator clamped in the housing, as well as means for cooling the stator.

Currently, a rotating electric machine, such as a high-power electric motor for moving a motor vehicle, requires cooling means for its various component parts, and in particular for the stator due to the high heat generation of such rotating machines. EP 1109298 discloses an electric motor which comprises a stator body made from a stack of blades or magnetic plates in which notches are arranged making it possible to receive the stator winding. Furthermore, the stator body has longitudinally oriented channels and a coolant circulates within these channels. However, in certain configurations for fixing the stator, and in particular the stator body, in a housing, such a longitudinal flow of the coolant within the channels is not compatible: this is the case when the stator body is clamped between two clamp members of the housing which bear by clamping on the two longitudinal ends of the stator body and the cooling of the rotating electric machine becomes problematic.

SUMMARY

A rotating electric machine is disclosed in which the stator is clamped in the housing between two clamp members, which does not have the above drawbacks.

To this end, there is provided a rotating electric machine comprising a housing comprising first and second clamp members and an inner face, a stator comprising a stator body clamped between the first and second clamp members and having an outer face extending opposite the inner face together defining an annular cooling chamber surrounding the stator body, the stator body comprising a longitudinal stack of stator sheets, each of which stator sheet comprises an annular core having an outer circumference and at least two radially centrifugal protuberances projecting from the outer circumference of the annular core, in the annular cooling chamber, and diametrically opposite one another, the stator sheets of the longitudinal stack being identical and two adjacent stator sheets of the longitudinal stack being angularly offset from each other such that the respective protuberances thereof do not extend opposite one another.

Advantageously, but optionally, the rotating electric machine has at least one of the following technical features:
- each protuberance comprises first and second faces connecting the outer circumference of the annular core to a radially outer face forming an apex of the respective protuberance, wherein at least one of the first and second faces is tangential to the outer circumference; the other of the first and second faces is tangential to the outer circumference;
- each stator sheet of the stack is also clamped in the annular cooling chamber, the protuberances resting on the inner face of the housing;
- the protuberances comprise a radially outer face forming an apex of the respective protuberance, the radially outer face being in surface contact with the inner face of the housing body;
- the machine comprises means for supplying coolant to the annular cooling chamber;
- the coolant supply means is positioned in the upper part of the housing;
- the machine comprises means for discharging coolant from the annular cooling chamber;
- the coolant discharge means is positioned in the lower part of the housing; and
- the coolant discharge means comprises a recovery tank.

The coolant can be a gas, for example air, or a liquid, for example water or oil.

The coolant supply means can be uniformly distributed over a width of the annular cooling chamber, for example in a longitudinal direction of the rotating electric machine. Such an arrangement can allow a uniform distribution of the coolant in the annular chamber.

BRIEF DESCRIPTION OF THE FIGURES

Other features and advantages of the claimed invention will emerge on reading the following description of an embodiment of the claimed invention. In the accompanying drawings:

FIG. 1 is a schematic sectional view of an embodiment of a rotating electric machine;

FIG. 2 is a three-dimensional sectional view of the machine of FIG. 1;

FIG. 3 is a three-dimensional sectional detail view illustrating the arrangement of the stator body of the machine of FIG. 1;

FIG. 4 is a side view of a stator sheet for a rotating electric machine;

FIG. 5 is a partial sectional view along line V-V of the housing and of the stator body of the machine of FIG. 1; and FIG. 6 is a detail view of the upper part of FIG. 5.

DETAILED DESCRIPTION

With reference to FIGS. 1 and 2, we will describe the general architecture of an embodiment of a rotating electric machine 1.

The rotating electric machine 1 comprises a housing 10, here formed by a housing cover 12 and by a housing body 11 comprising a bottom 13. The rotating electric machine 1 further comprises, provided within the housing 10, a rotor 50 mounted fixedly on a rotor shaft 51. The rotor shaft 51 is held in the housing 10, free to rotate, by a bearing 52 in the housing cover 12 and by a bearing 53 in the bottom 13 of the housing body 11.

Furthermore, the rotating electric machine 1 comprises a stator 40 mounted fixedly in the housing body 11 so as to completely surround the rotor 50. The stator 40 comprises a stator body 41 and a winding received longitudinally in the stator body 41 and having winding heads 42 projecting longitudinally on either side of the stator body 41. The stator body 41 has an outer face 43, shown to be cylindrical. The stator body 41 is held in place, firstly, between first 14 and second 15 clamp members provided for this purpose in the housing body 11. For example, the first clamping member 14 is secured to the housing body 11 while the second clamp member 15 is attached during assembly of the rotating electric machine 1. Thus, the stator body 41 is clamped in the housing 10 between the first 14 and second 15 clamp members. Positioned between the first 14 and second 15 clamp members, the housing 10 has an inner face 17, which is generally cylindrical. Once the assembly of the rotating electric machine 1 has been completed, the inner face 17 extends opposite the outer face 43 of the stator body 41.

Once the stator body 41 is clamped between the first 14 and second 15 clamp members in the housing 10, the inner 17 and outer 43 faces as well as the first 14 and second 15 clamp members define an annular cooling chamber 21, The inner 17 and outer 43 faces define the annular cooling chamber 21 radially and the first 14 and second 15 clamp members define it longitudinally. Thus, the rotating electric machine 1 comprises an annular cooling chamber 21 which is continuous and which completely surrounds the stator body 41 in a coaxial manner. Longitudinally, the annular cooling chamber 21 extends over almost a width of the stator body 41.

In order to supply the annular cooling chamber 21, the rotating electric machine 1 comprises means 20 for supplying coolant. Here, the coolant supply means 20 is positioned in an upper part of the housing 10. Here it takes the form of at least one orifice 20 passing through a side wall of the housing body 11, the at least one orifice 20 opening into the annular cooling chamber 21 at the inner face 17 of the housing body 11. FIG. 1 illustrates a series of three orifices 20 uniformly distributed over a width of the annular cooling chamber 21, in a longitudinal direction of the rotating electric machine 1.

Furthermore, the rotating electric machine 1 comprises means 16, 30, 118 for discharging coolant. Here, the coolant discharge means is positioned in the lower part of the housing 10, for example diametrically opposite the coolant supply means 20. The coolant discharge means comprises a recovery tank 16 provided with an outlet orifice 30. The recovery tank 16 has a width less than the width of the annular cooling chamber 21 in a longitudinal direction of the rotating electric machine 1. Furthermore, the rotating electric machine 1 comprises a separating wall 117 between the annular cooling chamber 21 and the recovery tank 16. This separating wall 117 here is a portion of a cylinder secured to the housing body 11. It comprises a fluid communication orifice 118 between the annular cooling chamber 21 and the recovery tank 16.

The stator body 41 of the rotating electric machine 1 comprises a longitudinal stack of stator sheets 410 clamped not only between the first 14 and second 15 clamp members, but also in the annular cooling chamber 21 against the inner face 17, as will now be described.

Referring to FIG. 4, the stator sheet 410 comprises an annular core 433 having a radially inner circumference 431 which, when mounting the rotating electric machine 1, surrounds the rotor 50 in a coaxial manner, and a radially outer circumference 430 which, when mounting the rotating electric machine 1, partially defines the outer face 43 of the stator body 41. Furthermore, the stator sheet 410 here comprises two radially centrifugal protuberances 432 projecting from the outer circumference 430 of the annular core 433. Each of the protuberances 432 has a radially outer face forming an apex 435 of the protuberance 432 considered. In addition, each of the protuberances 432 comprises first 436 and second 437 faces connecting the outer circumference 430 of the annular core 433 to the apex 435 of the respective protuberance. Here, the first 436 and second 437 faces are tangential to the outer circumference 430 of the annular core 433 of the stator sheet 410. The apex 435 of each protuberance 432 extends circumferentially over an angular sector of between 30° and 60°, preferably between 45° and 60°, and even more preferably on the order of 50°. It should be noted that the stator sheet 410 thus produced has a central symmetry from center a geometric center C of the annular core 433. Thus, all the stator sheets 410 of the stack are identical, making it possible to reduce the production costs of the resulting stator body 41.

Although not shown, the annular core 433 comprises through-orifices distributed over a circumference. Once the stack has been produced, these through-orifices will define notches for receiving the strands of the winding of the stator 40.

When making the longitudinal stack to form the stator body, the stator sheets 410 are stacked so that two adjacent stator sheets 410a and 410b (FIG. 2, 3, 5, 6) are angularly offset with respect to one another so that their respective protuberances do not extend opposite one another. As illustrated here, the angular offset is on the order of 90°. Thus, as can be seen in FIGS. 5 and 6, in side view, the second face 437 of the protuberance 432 of the stator sheet 410a is parallel to and aligned with the first face 436 of the protuberance 432 of the stator sheet 410b adjacent to the stator sheet 410a. It is the same for the first face 436 of the protuberance 432 of the stator sheet 410a, which is parallel to and aligned with the second face 437 of the protuberance 432 of the stator sheet 410b adjacent to the stator sheet 410a.

Once the stator body 41 thus formed is in place in the housing 10, the apices 435 of each of the protuberances 432 of each stator sheet 410 bear on the surface of the inner face 17 of the stator body 41, thus allowing clamping of each stator sheet 410 in the housing 10. This reinforces the final retention of the stator body 41 in the housing 10.

Furthermore, the annular cooling chamber 21 is defined by all the faces 430, 436, 437 of the stator sheets 410 forming the outer face 43 of the stator body 41 and the inner face 17 of the housing body 11. Over the entire angular extent of the protuberances 432, the annular cooling chamber 21 has circumferential portions of cooling channels 210 which are parallel to one another over the same angular extent and offset by a thickness of stator sheet 410 over an adjacent angular extent. Between two adjacent angular extents, a flat being formed by the succession of the first 436 and second 437 faces of the protuberances 432 during stacking, each channel 210 of an angular extent is in fluid communication with the channels 210 of the adjacent angular extent. This allows a distribution of the coolant in the annular cooling chamber 21.

During operation, the coolant is introduced into the annular cooling chamber 21 via the orifices 20 of the coolant supply means. Preferably, the coolant is injected under pressure so as to optimally occupy a volume of the annular cooling chamber 21: thus, the coolant flows over the entire outer face 43 of the stator body 41, in particular along all of the circumferential channels 210 to end up flowing into the recovery tank 16 via the orifice 118 and being extracted from the annular cooling chamber via the outlet orifice 30.

The rotating electric machine 1 which has just been described enables cooling of the stator body 41, and therefore of the stator 40, by direct contact of the coolant on one face, the outer face 43 here, of said stator body. This makes it possible to have contact over an entire circumference of the stator body 41 so as to capture the heat to be removed optimally over this entire circumference. This capture is all the more effective when the stator body 41 is a longitudinal stack of stator sheets 410 because the coolant is in contact with the elements of the stack by the edge (outer circumference 430, first 436 and second 437 faces of the protuberances 432), these elements having better thermal conductivity in the radial direction than in a longitudinal direction.

The rotating electric machine 1 which has just been described can be a synchronous or asynchronous machine. It is in particular a machine for traction or propulsion of electric motor vehicles (Battery Electric Vehicle) and/or hybrid motor vehicles (Hybrid Electric Vehicle-Plug-in Hybrid Electric Vehicle), such as passenger cars, vans, trucks, buses or coaches. The rotating electric machine 1 can also be used in industrial and/or energy production applications, such as wind turbines, boats or submarines.

Of course, it is possible to make numerous modifications to the claimed invention without departing from the scope thereof.

The invention claimed is:

1. A rotating electric machine comprising a housing comprising first and second clamp members and an inner face, a stator comprising a stator body clamped between the first and second clamp members and having an outer face extending opposite the inner face together defining an annular cooling chamber surrounding the stator body, the stator body comprising a longitudinal stack of stator sheets, each stator sheet comprising an annular core having an outer circumference and at least two radially centrifugal protuberances projecting from the outer circumference of the annular core, in the annular cooling chamber, and diametrically opposite one another, wherein the stator sheets of the longitudinal stack are identical and in that two adjacent stator sheets of the longitudinal stack are angularly offset from each other such that the respective protuberances thereof do not extend opposite one another.

2. The machine according to claim 1, wherein each protuberance comprises first and second faces connecting the outer circumference of the annular core to a radially outer face forming an apex of the respective protuberance, at least one of the first and second faces being tangential to the outer circumference.

3. The machine according to claim 2, wherein the other of the first and second faces is tangential to the outer circumference.

4. The machine according to claim 1, wherein each stator sheet of the stack is also clamped in the annular cooling chamber, the protuberances resting on the inner face of the housing.

5. The machine according to claim 4, wherein the protuberances comprise a radially outer face forming an apex of the respective protuberance, the radially outer face being in surface contact with the inner face of the housing body.

6. The machine according to claim 1, wherein the machine comprises means for supplying coolant to the annular cooling chamber.

7. The machine according to claim 6, wherein the coolant supply means is positioned in the upper part of the housing.

8. The machine according to claim 1, wherein it comprises means for discharging coolant from the annular cooling chamber.

9. The machine according to claim 8, wherein the coolant discharge means is positioned in the lower part of the housing.

10. The machine according to claim 8, wherein the coolant discharge means comprises a recovery tank.

11. The machine according to claim 1, wherein the coolant is a liquid.

12. The machine according to claim 1, wherein the coolant supply means is uniformly distributed over a width of the annular cooling chamber, in a longitudinal direction of the rotating electric machine.

* * * * *